United States Patent [19]

Koshika et al.

[11] Patent Number: 5,339,580
[45] Date of Patent: Aug. 23, 1994

[54] LAMINATED RUBBER BUILDING SUPPORT AND VIBRATION DAMPING DEVICE

[75] Inventors: Norihide Koshika; Mitsuo Sakamoto; Isao Nishimura; Katsuyasu Sasaki; Satoshi Oorui, all of Tokyo, Japan

[73] Assignee: Kajima Corporation, Tokyo, Japan

[21] Appl. No.: 976,496

[22] Filed: Nov. 13, 1992

[30] Foreign Application Priority Data

Nov. 15, 1991 [JP] Japan .................. 3-300409

[51] Int. Cl.⁵ .............................................. E04B 1/98
[52] U.S. Cl. ........................... 52/167 E; 52/167 EA; 248/632
[58] Field of Search .......... 52/167 E, 167 EA, 167 R, 52/167 DF; 248/632, 634

[56] References Cited

U.S. PATENT DOCUMENTS

| | | | |
|---|---|---|---|
| 4,593,501 | 6/1986 | Delfosse | 52/167 EA |
| 4,901,486 | 2/1990 | Kobori et al. | 52/167 DF |
| 4,950,528 | 8/1990 | Iizuka et al. | 52/267 |
| 4,978,581 | 12/1990 | Fukahori et al. | 52/167 E X |
| 5,014,474 | 5/1991 | Fyfe et al. | 52/167 EA |
| 5,022,201 | 6/1991 | Kobori et al. | 52/167 |
| 5,097,547 | 3/1992 | Tanaka et al. | 52/167 R |
| 5,201,155 | 4/1993 | Shimoda et al. | 52/167 E |

FOREIGN PATENT DOCUMENTS

| | | |
|---|---|---|
| 648388 | 5/1964 | Belgium . |
| 0380304 | 1/1990 | European Pat. Off. . |
| 0411876 | 2/1991 | European Pat. Off. .......... 52/167 E |
| 1264876 | 9/1969 | Fed. Rep. of Germany . |
| 762631 | 10/1933 | France . |
| 1534995 | 7/1967 | France . |
| 63-156171 | 6/1988 | Japan . |
| 1-275866 | 6/1989 | Japan . |

OTHER PUBLICATIONS

Nikkei Architecture, Jul. 14, 1986, pp. 54–75 European Patent Office Search Report.

*Primary Examiner*—Philip C. Kannan
*Attorney, Agent, or Firm*—James H. Tilberry

[57] ABSTRACT

A plurality of laminated rubber or rubber-like elastoplastic ring-configured pads vertically stacked and secured together to provide seismic damping for a building structure. The laminated pads include ring-like steel plates or solid disk-like steel plates to form one laminated stage of a multi-stage seismic damping device. A plurality of damping devices are used to support a vibratable mass on a building structure. The combination of stacked ring-configured elastoplastic pads and steel plates provides a damping device having a high lateral deformation capacity with a long period and high resistance to buckling. The damping device is suitable for protecting building structures having long natural periods, such as multi-storied buildings.

27 Claims, 7 Drawing Sheets

F I G. 16
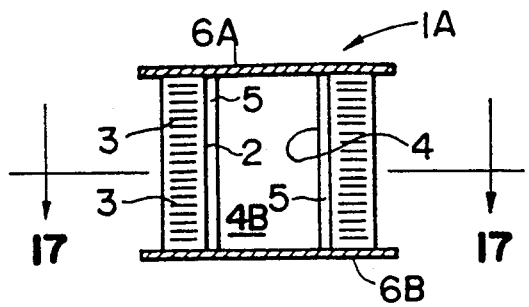
F I G. 17
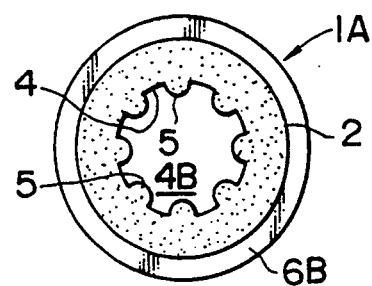
F I G. 18
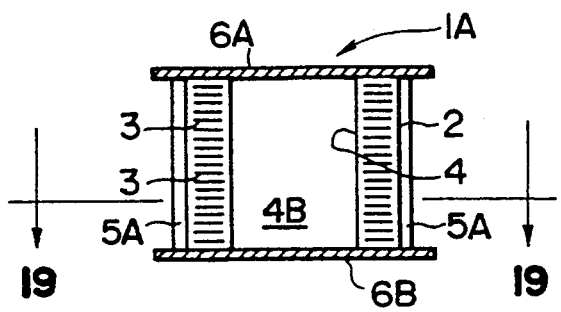
F I G. 19
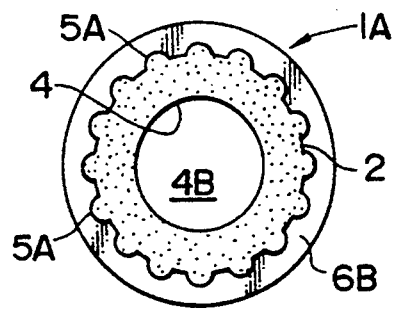
F I G. 20
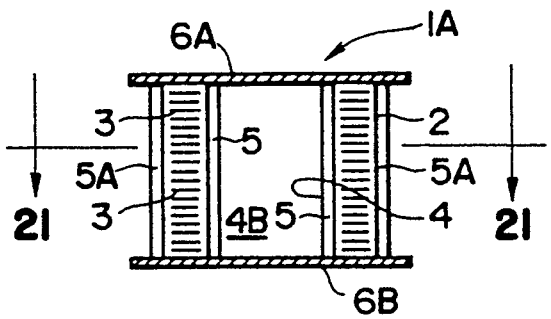
F I G. 21
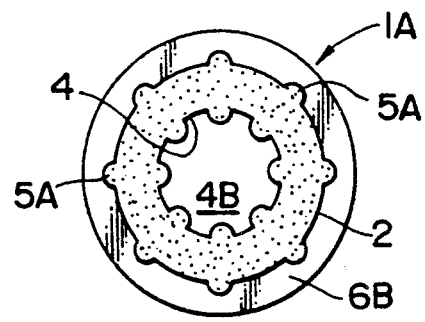
F I G. 22
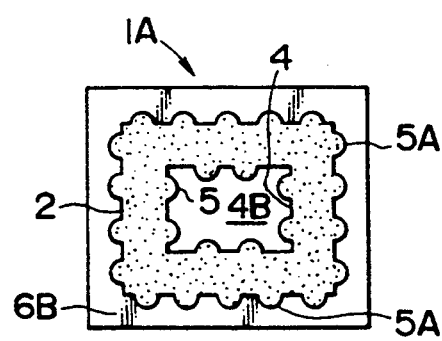

LAMINATED RUBBER BUILDING SUPPORT AND VIBRATION DAMPING DEVICE

BACKGROUND OF THE INVENTION

1. Field of the Invention

The field of the invention is the employment of damping means to support structures for controlling vibration caused by external forces.

2. Description of the Prior Art

Laminated rubber supports for structures have been developed as illustrated in the Nikkei Architecture issue of Jul. 14, 1986, pp. 54–75. The conventional prior art laminated rubber support comprises vertically arrayed layers of solid rubber between which steel plates are interposed. The resultant lamination is sandwiched between upper and lower steel plates, which provide means for securing the lamination to upper and lower structures, such as a building superstructure and its foundation.

Conventionally, a solid laminated rubber support used in a structure's base isolation substructure deforms in proportion to its height. However, the diameter of the support must be reduced in order to reduce shearing stiffness. Therefore, two desirable physical properties of a solid prior art laminated rubber support, i.e., high deformation and low shearing moduli, have heretofore been difficult to obtain simultaneously.

As shown in prior art FIGS. 23 and 24, reduction of shearing modulus and increase in deformation modulus have been attempted by forming a hollow laminated rubber support. In so doing, however, the resistance of the support against buckling is reduced.

With reference to laminated rubber supports for uses other than as base isolation means, they have been known for use as springs in passive type vibration control devices and as spring elements or supporting devices in active type vibration control devices for controlling the vibration of a structure by applying a control force such as with oil pressure or electromagnetic force. In these vibration control devices, normally the natural period of the spring is synchronized with the natural period of a structure or it is set to be a period longer than the natural period of the structure (e.g., in cases where the vibration control device is used as a supporting device). A large stroke becomes necessary for getting a large seismic response control from a compact device. For example, an active-type vibration control device as disclosed in Japanese Pat. Laid-open No. 1-275866 is constructed with a weight which is hung from an upper steel frame and supported horizontally by pulleys and hanging members and in a way that the weight is capable of making relative movement against a building. The weight is connected to the building through a hydraulic cylinder. With direction from a control device, the weight pushes the cylinder through a hydraulic servo valve. The center of the cylinder is supported by a pin at the center of gravity of the weight and a piston of the cylinder is fixed to the building. However, there is a problem with this device in that the resulting movement in a vertical direction is also increased accordingly as the stroke becomes longer. In addition, when the natural period of a structure as a seismic response control object becomes longer, it becomes harder to use the laminated rubber supports having the period matching to such a device as described above. There is still a further problem, when vibrating the weight by means of the actuator as described, that the vibration due to the drive is transmitted to the building, resulting in the transmission of noise and undesirable vibration in the floor upon which the device is installed.

SUMMARY OF THE INVENTION

The damping device of the present invention comprises a plurality of vertically stacked rubber dampers. Each rubber damper includes a plurality of vertically arrayed, ring-shaped, hollow rubber pads between which are interposed steel bonding plates. Steel end plates are also bonded to the upper and lower surfaces of each of the rubber dampers, which facilitates vertical stacking and provides the means for securing the stack as an integral unit.

Each inventive damping device has the advantage that the shearing stiffness thereof is minimal, and the deformation capacity thereof is great, in comparison with prior art solid laminated rubber supports. The rubber dampers may have the same diameters, or the diameters may be graduated from damper to damper so as to provide a pyramidal-configured damping device.

In another embodiment of the invention, the stacking may include a mix of prior art solid rubber dampers with the inventive hollow rubber dampers in order to obtain a particular desired shearing stiffness and/or length of stroke. In either event, the vibration control damping device of the present invention functions as a spring element as well as a supporting device, for keeping the damping device in a neutral position whether the device is active or passive.

In use as a dynamic damping device (hereinafter DD), the device is positioned with like devices at predetermined positions relative to a supported structure as seismic response control means in conjunction with an additional body of predetermined mass $m_d$ mounted on the damping device. It is considered that the mass $m_d$ of the additional mass body is within the normal range of 1/50 to 1/100 of a mass $m_1$ of the structure. The damping device functions as a spring with a spring constant $k_d$, having great deformability in a horizontal direction and a long period corresponding to the natural period of the supported structure.

The subject inventive damping device may be used, for instance, with:

(a) An actuator for applying a control force u(t) corresponding to the vibration of the structure between the structure having a mass $m_1$ and the additional mass body having a predetermined mass $m_d$ (designated as AMD hereinafter).

(b) A spring having a predetermined spring constant $k_d$ between the structure and the additional mass body in the construction of (a) above synchronizes the period in the case of freely vibrating the additional mass body with the natural period of the structure (designated as HMD hereinafter).

(c) A double mass damper (designated as DMD hereinafter) provides a second additional mass body having a predetermined mass $m_d$ for an additional mass body having a predetermined mass $m_a$ which allows a control force u(t) between the first additional mass body and the second additional mass body, and synchronizes the periods of the first additional mass body $m_a$ and the second additional mass body $m_d$ with the natural period of the structure using a spring with a constant $k_b$, in which a control force u(t) is applied between the first and second additional mass bodies. A plurality of damping devices are installed at predetermined positions on the structure as a seismic response control device, and the additional mass body having the predetermined mass $m_d$ (or $m_a$) is mounted on the damping devices. In the case of active mass dampers (AMD), the damping devices are preferably used to support the additional mass body in a vertical direction and to function as springs for keeping the additional mass body in a neutral position with respect to horizontal deflection. The damping devices should have longer periods than the natural period of the structure so as not to be counterproductive when the control force u(t) is applied.

As to the noise and vibration problems associated with AMD, these problems are reduced when the additional mass body is supported by the inventive damping devices.

OBJECTS OF THE INVENTION

Accordingly, it is an object of the present invention to provide a damping device having little shearing stiffness and a long period highly stabilized against deformation by the stacking of hollow laminated rubber dampers in multi-stages by means of connection plates.

It is another object of the present invention to provide a readily producible damping device with an easily adjustable spring constant in a horizontal direction by means of the number of laminated rubber dampers stacked in a vertical direction.

It is a further object of the present invention to provide a passive or active type vibration damping device which comprises a spring element having a long period and a large stroke, and is suitable to a structure having a long period, such as a tall building.

It is a still further object of the present invention to provide a vibration damping device which can reduce noise and vibration in the structure, particularly on the floor on which the device is installed, by supporting an additional mass body using the above-described laminated rubber damping device as a spring element and/or a supporting device.

Finally, it is another object of the present invention to provide a compact vibration control device having simplified construction by using the above-described damping device as a spring element and/or as a supporting device for structures.

BRIEF DESCRIPTION OF THE DRAWINGS

The foregoing and other objects and features of the invention will become apparent from the following description of preferred embodiments of the invention with reference to the accompanying drawings, in which:

FIG. 16 is a sectional elevational view of a preferred embodiment of a hollow rubber damper in which reinforcing ribs are integral with the interior wall;

FIG. 17 is a partially sectioned plan view of a hollow rubber damper taken along the line 17—17 of FIG. 16;

FIG. 18 is a sectional elevational view of a preferred embodiment of a hollow rubber damper in which reinforcing ribs are integral with the exterior wall;

FIG. 19 is a partially sectioned plan view of a preferred embodiment of a hollow rubber damper taken along the line 19—19 of FIG. 18;

FIG. 20 is a sectional elevational view of a preferred embodiment of a hollow rubber damper in which reinforcing ribs are integral with the exterior and interior walls;

FIG. 21 is a partially sectioned plan view of a preferred embodiment of a hollow rubber damper taken along the line 21—21 of FIG. 20;

FIG. 22 is a partially sectioned plan view of a preferred embodiment of a hollow rubber damper with rib-reinforced polygonal exterior and interior walls;

DETAILED DESCRIPTION OF THE PREFERRED EMBODIMENTS

As used in this description of the invention, the term "ring" shall mean not only a flat circular member with a center opening but also a flat polygonal-sided member with a center opening. The term "disk" shall mean not only a flat circular member with no opening, but also a flat polygonal-sided member with no opening.

Figure 1:
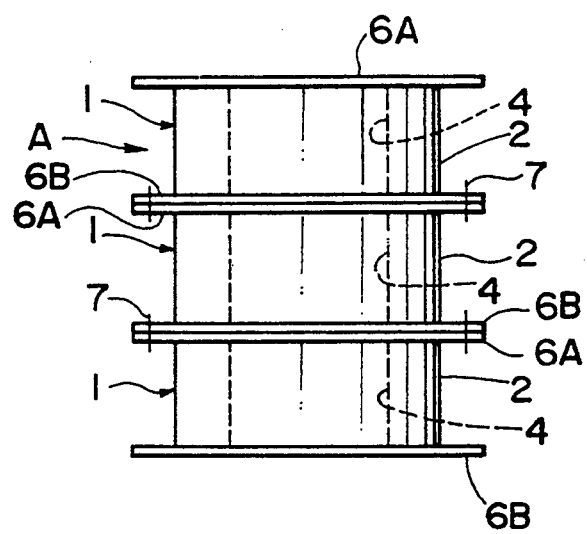
FIG. 1 is an elevational view of a preferred embodiment of the inventive damping device in which the stacked laminated rubber dampers of the device are of uniform diameter.
Figure 25:
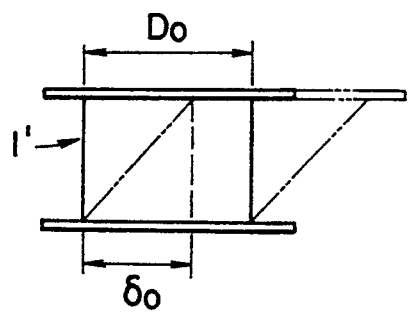
FIG. 25 is a schematic elevational view of a solid rubber damper showing its potential lateral deformation.
Figure 26:
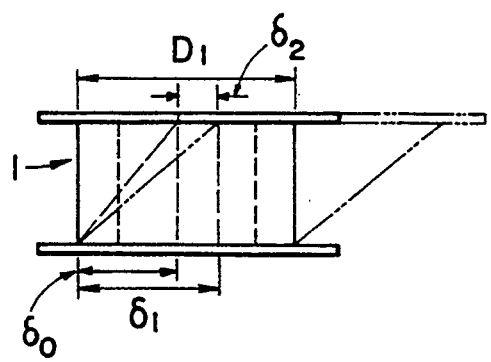
FIG. 26 is a schematic elevational view of a hollow rubber damper showing its potential lateral deformation.
Figure 27:
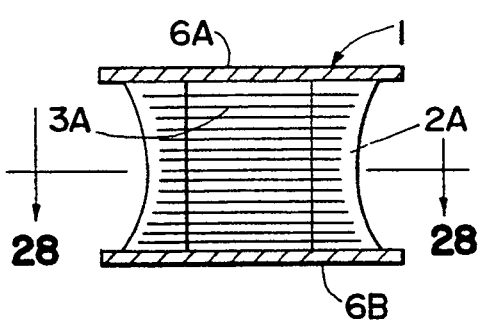
FIG. 27 is a sectional elevational view of a preferred embodiment of a hollow rubber damper similar to FIG. 9, but with solid disk-type steel laminated plates.
Figure 28:
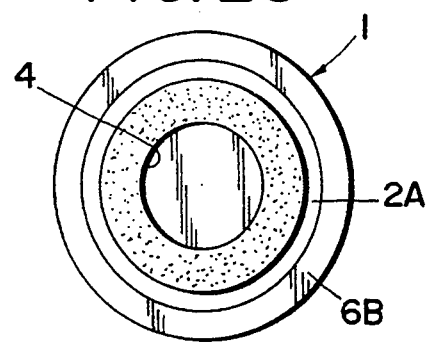
FIG. 28 is a plan view of a preferred embodiment of a hollow rubber damper taken along the line 28—28 of FIG. 27.
Figure 29:
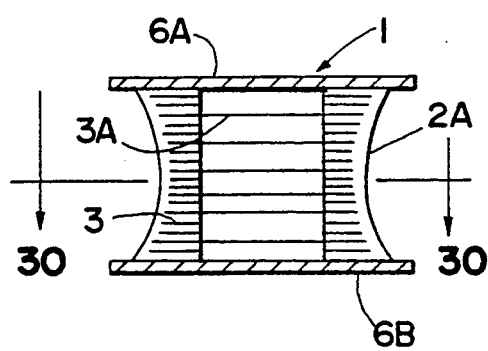
FIG. 29 is an elevational view in section of a preferred embodiment of a hollow rubber damper similar to FIGS. 9 and 27, but reinforced with both ring-shaped steel plates and disk-shaped steel plates.
Figure 30:
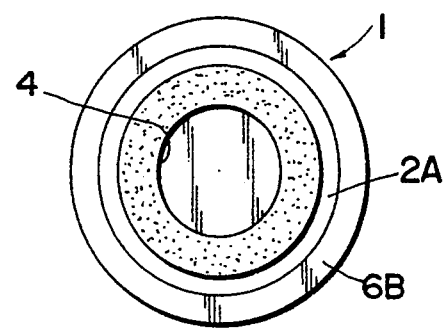
FIG. 30 is a plan view of a preferred embodiment of a hollow rubber damper taken along the line 30—30 of FIG. 29.
Figure 31:
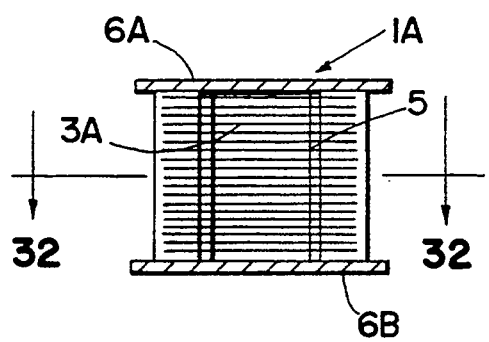
FIG. 31 is an elevational view in section of a preferred embodiment of a hollow rubber damper similar to FIG. 16, but reinforced with disk-shaped steel plates.
Figure 32:
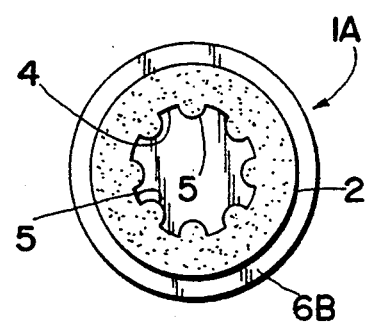
FIG. 32 is a plan view of a preferred embodiment of a hollow rubber damper taken along the line 32—32 of FIG. 31.
Figure 33:
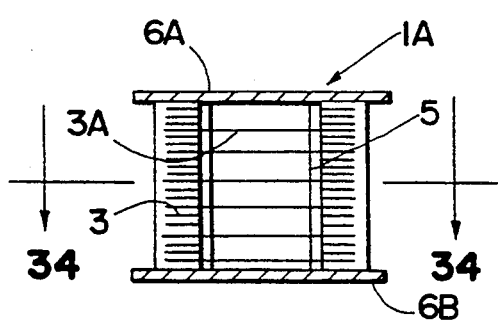
FIG. 33 is an elevational view in section of a preferred embodiment of a hollow rubber damper similar to the embodiments shown in FIGS. 16 and 31, but reinforced with both ring-shaped steel plates and disk-shaped steel plates.
Figure 34:
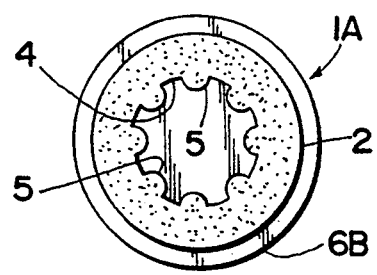
FIG. 34 is an elevational view in section of a preferred embodiment of a hollow rubber damper taken along the line 34—34 of FIG. 33.

FIG. 1 shows a vertical stacked three-stage laminated hollow rubber damping device A as a preferred embodiment of the present invention, comprising three hollow laminated rubber dampers 1 connected to each other by interposed steel plates 6 and fasteners 7. A prior art monolithic laminated rubber damping device of the same height as the inventive device of FIG. 1 will buckle before the inventive device of FIG. 1, thereby reducing the effective stroke of the monolithic damping device compared to the effective stroke of the inventive multi-stage damping device. Furthermore, the use of the inventive hollow laminated rubber damping device provides a longer stroke in fewer stages than solid multi-stage laminated rubber damping devices. In addition, since fewer stages are required for a hollow laminated rubber damping device than for a solid laminated rubber damping device, less vertical clearance is required for the inventive damping device without sacrificing the benefits of a long period. FIGS. 25 and 26 compare the deformation potential of a solid laminated rubber damper, FIG. 25, with the deformation potential of a hollow laminated rubber damper, FIG. 26. As shown in FIG. 26, Delta$_1$ ($\delta_1$) exceeds Delta$_0$ ($\delta_0$) by Delta$_2$ ($\delta_2$), which is depicted as substantially thirty percent.

Figure 2:
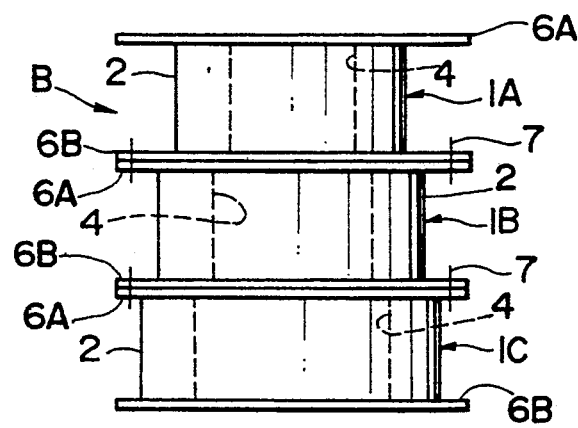
FIG. 2 is an elevational view of a preferred embodiment of the inventive damping device in which the stacked laminated rubber dampers of the device, from top to bottom of the stack, have increasing diameters.

FIG. 2 shows a pyramidal-configured laminated hollow rubber damping device as another preferred embodiment of the present invention in which the diameter of each stage of laminated rubber dampers increases from top damper 1A to bottom damper 1C. With this configuration, horizontal deformation is maximized while at the same time improving stability and anti-buckling strength.

Figure 3:
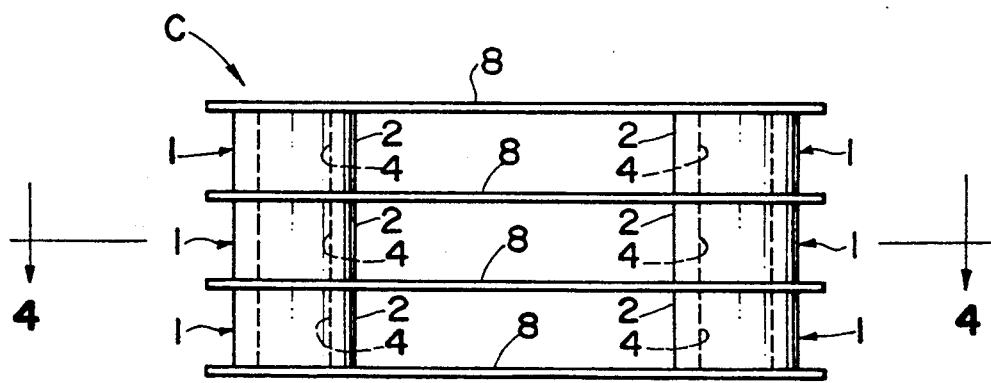
FIG. 3 is an elevational view of a preferred embodiment of the invention in which a plurality of inventive damping devices are secured together with steel plates.
Figure 4:
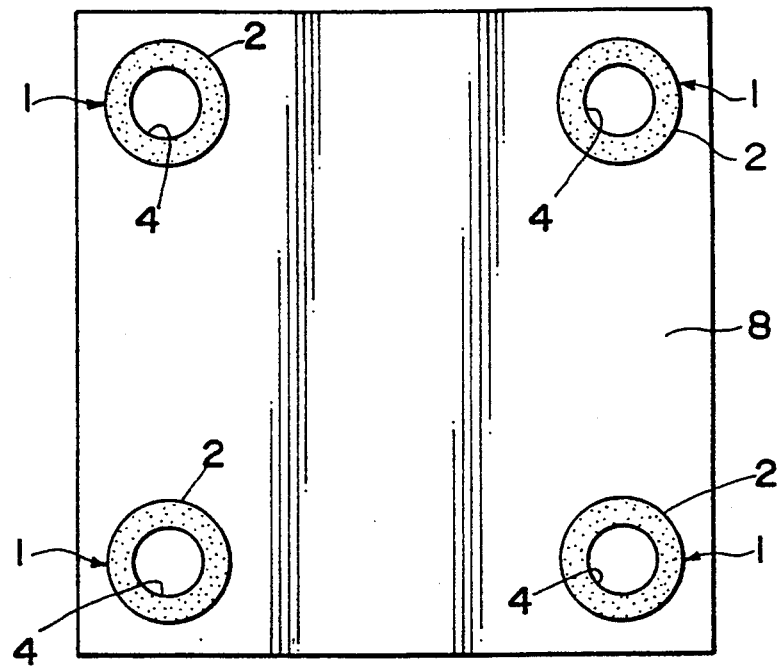
FIG. 4 is a partially sectioned plan view of a preferred embodiment of the invention taken along the line 4—4 of FIG. 3.

FIGS. 3 and 4 show a further preferred embodiment of the present invention in which a plurality of spaced-apart hollow laminated rubber damping devices are connected to each other by means of horizontal connection plates 8. Connection plates 8 provide a parallelogram-type mechanism wherein the plates 8 shift horizontally as the damper 1 of damping devices C laterally deforms.

Figure 5:
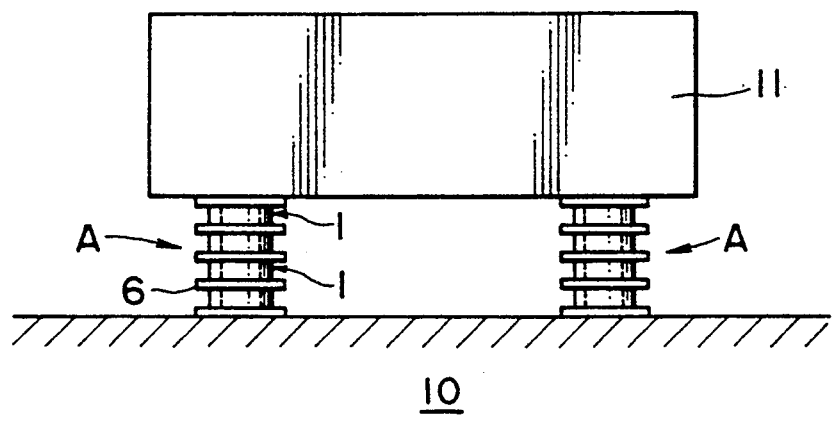
FIG. 5 is an elevational view of a passive mass damper using inventive damping devices as supports and springs.

FIG. 5 shows a preferred embodiment of the invention in which an additional mass body 11 is supported by four laminated damping devices A on a structure 10. The damping devices have large strokes and long periods corresponding to the natural period of the structure 10 obtained by vertically stacking single hollow laminated rubber dampers 1 in a plurality of stages.

Where the mass of the structure 10 is expressed as $m_1$, the mass of the additional mass body 11 is expressed as $m_d$, the spring constant of the main body of the structure is expressed as $k_1$, the spring constant of the hollow laminated rubber damping device A is expressed as $k_d$, and a damping coefficient is expressed as $c_d$, the intrinsic angular frequency of the structure 10, comprising a main vibration system may be expressed as:

$$\omega_1 = (k_1/m_1)^{1-2}$$

The mass $m_d$ of the additional mass body 11, comprising a vibration absorption system, is selected so that the ratio $\mu$ of the mass $m_d$ to the main $m_1$ of the structure 10 may be $$\mu = m_d/m_1 \geq 0.01$$

and at this time, the intrinsic angular frequency of the vibration absorption system $\omega_d$ is given by:

$$\omega_d = (1/1 + \mu)\omega_1$$

Then, the damping coefficient $c_d$ and the damping factor $h_d$ are expressed by:

$$c_d = 2m_d\omega_d h_d$$

$$h_d = [3\mu/8(1+\mu)]^{\frac{1}{2}}$$

Figure 6:
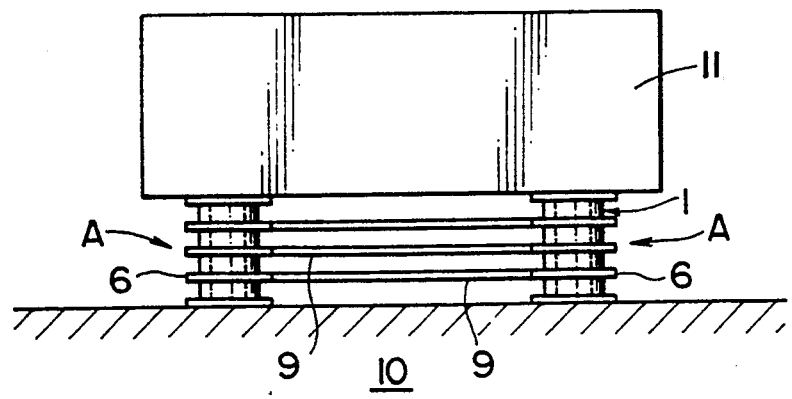
FIG. 6 is an elevational view of a passive mass damper similar to FIG. 5 and including reinforcing steel plates to interconnect the inventive damping devices.

FIG. 6 shows an additional mass 11, with steel connection plates 9 to give mass 11 high stability such as described with respect to FIGS. 3 and 4.

Figure 7:
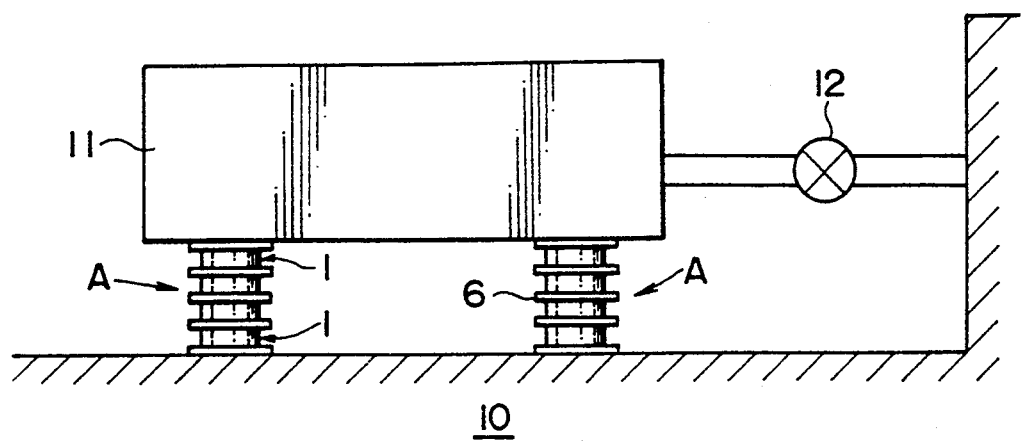
FIG. 7 is an elevational view of an active mass damper using inventive damping devices as springs to support a vibratable mass with an actuator.

FIG. 7 shows a mass 11 mounted on the inventive damping devices A, such as shown in FIG. 5, and including an actuator 12 which applies a vibration control force u(t) to mass 11 to control the vibration of the structure 10. The actuator may be hydraulic, electromagnetic, or the like.

The stacked hollow laminated rubber dampers 1, in combination to form the inventive damping device, function as springs between the main body of the structure 10 and the additional mass body 11, wherein:

$$\omega_d \leq (\tfrac{1}{2})\omega_1$$

and the control force u(t) may be expressed as:

$$u(t) = G_1(dx_1/dt) + G_2(dx_d/dt)$$

in which $x_1$ is a displacement of the structure 10 and $x_d$ is a displacement of a first added mass body. $G_1$ shows a gain in a circuit including an AGC circuit or the like to the response speed of the structure. Furthermore, the second term in the above equation gives a damping property to the additional mass body side by adding a product resulting from multiplying a gain $G_2$ (minus sign) by the vibration speed of the additional mass body side to the control force, wherein more stabilization is attained.

In the case of HMD, the spring constant $k_d$ may be set so that the vibration of the additional mass body 11 is synchronized with the vibration of the structure 10, wherein:

$$\omega_d = \omega_1$$

and the control force u(t) may be expressed as:

$$u(t) = G_1(dx_1/dt) + G_2(dx_d/dt) + G_3(x_1 - x_d)$$

wherein $G_3$ is a gain having a minus sign, and a part of the intertial force acting on the additional mass body 11 at the vibration time is canceled by the third term so as to allow the additional mass body 11 to vibrate by a small control force.

Figure 8:
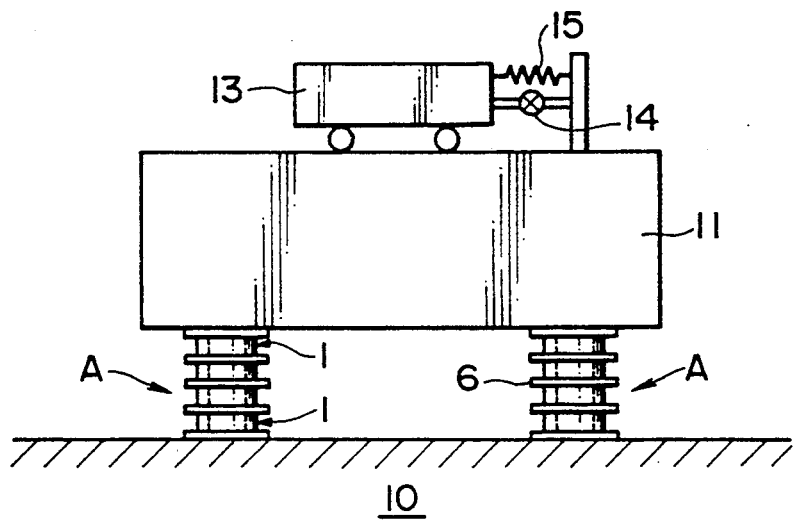
FIG. 8 is an elevational view of an active mass damper using inventive damping devices as springs to support first and second vibratable masses with an actuator.

FIG. 8 shows a preferred embodiment of the invention, wherein a second additional mass body 13 having a predetermined mass $m_b$ is further provided to the additional mass body 11 having a predetermined mass $m_a$ and the control force u(t) is added by an actuator 14 between the first additional mass body 11 and the second additional mass body 13 to actively control the vibration of the structure. With this arrangement, application to a structure 10 having a long period is possible when the additional mass body 11 is supported by the inventive hollow laminated rubber damping devices A. Since hollow laminated rubber supports have great deformability, the resulting vibration control is very effective.

FIGS. 9 through 22 show modifications of the hollow laminated rubber damper supports preferred for use in the present invention.

Figure 9:
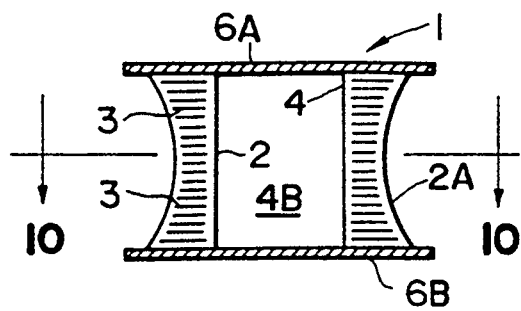
FIG. 9 is a sectional elevational view of a preferred embodiment of a hollow laminated rubber damper with an arcuate concave exterior wall assembled in an inventive damping device.
Figure 10:
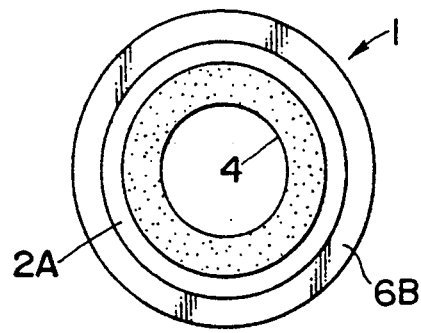
FIG. 10 is a partially sectioned plan view of a preferred embodiment of a hollow rubber damper taken along the line 10—10 of FIG. 9.

FIGS. 9 through 15 show hollow laminated rubber dampers with arcuate concave walls for use in preferred embodiments of the present invention. FIGS. 9 and 10 show a hollow laminated rubber damper having a plurality of ring-shaped steel plates 3 embedded between arcuately concave exterior wall 2A and vertical interior wall 4. Upper and lower steel plates 6A and 6B are rigidly secured to the upper and lower ends of the hollow laminated rubber damper 1. Upper and lower plates 6A and 6B may be vertically secured to upper and lower plates 6A and 6B of other laminated rubber dampers, such as with threaded fasteners 7, FIG. 2, or the like.

Figure 11:
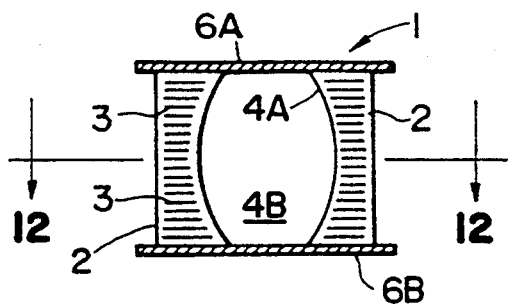
FIG. 11 is a sectional elevational view of a preferred embodiment of a hollow laminated rubber damper with an arcuate concave interior wall assembled in an inventive damping device.
Figure 12:
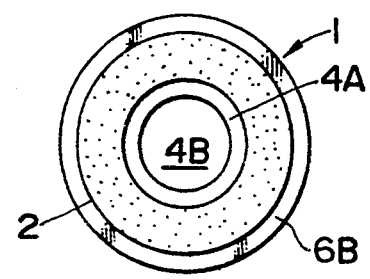
FIG. 12 is a partially sectioned plan view of a preferred embodiment of a hollow rubber damper taken along the line 12—12 of FIG. 11.
Figure 13:
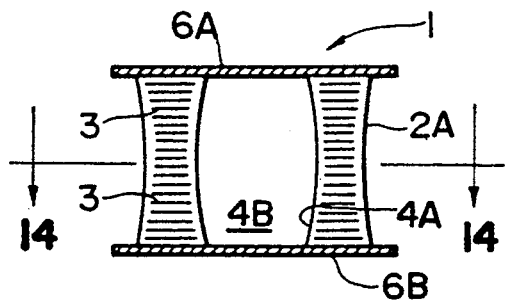
FIG. 13 is a sectional elevational view of a preferred embodiment of a hollow laminated rubber damper with arcuate concave exterior and interior walls assembled in an inventive damping device.
Figure 14:
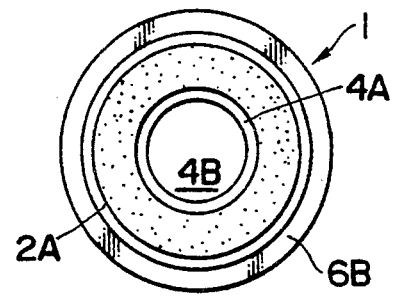
FIG. 14 is a partially sectioned plan view of a preferred embodiment of a hollow rubber damper taken along the line 14—14 of FIG. 13.

In contrast to FIGS. 9 and 10, in the device of FIGS. 11 and 12 the interior wall 4A is arcuately concave, whereas it is the exterior wall 2 which is vertical. In the embodiment of FIGS. 13 and 14, both the exterior wall 2A and the interior wall 4A are arcuately concave, although not as pronouncedly so as walls 2A and 4A of FIGS. 9 and 11, respectively.

Figure 15:
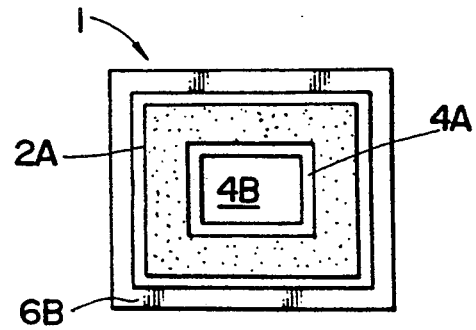
FIG. 15 is a partially sectioned plan view of a preferred embodiment of a hollow rubber damper with polygonal exterior and interior walls.
Figure 23:
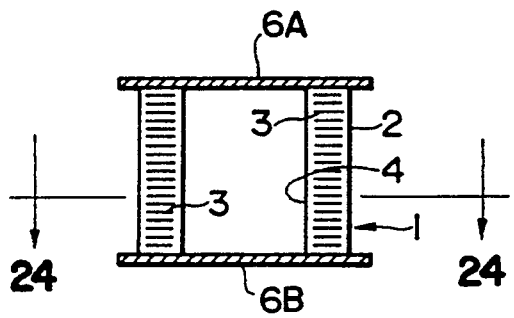
FIG. 23 is a sectional elevational view of a prior art laminated rubber damper.
Figure 24:
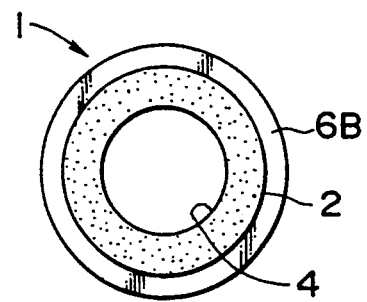
FIG. 24 is a partially sectioned plan view of a prior art laminated rubber damper taken along the line 24—24 of FIG. 23.

FIG. 15 shows an embodiment of the invention where the outer periphery of the laminated rubber support is rectangular. In cases where the outer shape is circular, the shearing stiffness of the hollow laminated rubber dampers are all the same. On the other hand, where the outer shape of the laminated rubber damper is made rectangular or elliptic, the shearing stiffness can be varied depending on the direction of the seismic force. For example, where the natural period of the structure as a base isolation or seismic response control object varies greatly depending on the direction thereof, effective base isolation and seismic response control become possible by altering the shearing stiffness depending on the direction. Even with respect to the non-uniform sections of the embodiments shown in FIGS. 9 through 14, it is possible to make the outer periphery of the hollow laminated rubber damper 1 rectangular or elliptic to give the hollow laminated rubber damper 1 directionality.

The steel plates 3 are ring shaped and embedded between the hollow rubber pads 2, but disk-type steel plates may be used so as to divide the hollow portion 4B within the rubber pads 2. It is within the contemplation of the invention to use all disk-type plates instead of ring-type steel plates in the hollow laminated rubber dampers 1. It is also within the contemplation of the invention to use disk-type steel plates interposed between the ring-shaped steel plates. By interposing some disk-type steel plates, a more stable construction will be obtained.

The hollow laminated rubber dampers shown in FIGS. 16 through 22 include vertical reinforcing ribs 5 to improve anti-buckling strength.

The device of FIG. 15 illustrates that in one embodiment of the inventive device, the horizontal cross section of the device may be rectangular, rather than circular, in certain applications. In the case where the outer shape of the device is circular, the shearing stiffness of the laminated rubber is the same in all directions. On the other hand, when the outer shape of the laminated rubber is made rectangular or elliptic, the shearing stiffness can be varied depending on the direction of the seismic impact. For example, where the natural period of the laminated support as a base isolation or seismic response control device varies depending on the direction of the seismic force, effective base isolation and seismic response control become possible by altering the shearing stiffness depending on the direction of stress. Even with respect to the annular cross-sections of the inner and outer walls of FIGS. 9, 11, and 13, these walls may be rectangular or elliptic to give the laminated rubber support customized shearing stiffness.

As shown in FIGS. 27, 28, 31, and 32, disk-type plates 3A may be used in lieu of ring-shaped plates 3. In the alternative, as shown in FIGS. 29, 30, 33, and 34, disk-type plates 3A may be interposed between the ring-shaped plates 3.

By selectively interspersing disk-type steel plates between ring-shaped plates, localized deformation may be controlled, resulting in more stable construction.

FIGS. 16 through 22 and 31 through 34 show preferred embodiments of the hollow laminated rubber dampers 1A with reinforcing ribs 5 and 5A.

The preferred embodiment of the hollow laminated rubber damper used in the invention, as shown in FIGS. 16 and 17, includes a plurality of vertical, circumferentially evenly spaced apart reinforcing ribs 5 projecting laterally from the interior wall 4 to stiffen the hollow laminated rubber damper support against buckling. By improving the buckling strength in this manner, it is possible to more fully make use of the deformability of a hollow laminated rubber damper structure having little shearing stiffness. In like manner, a plurality of vertical reinforcing ribs 5A are formed on the external wall surface 2 of the hollow laminated rubber damper 1 in the preferred embodiment shown in FIGS. 18 and 19.

In the preferred embodiment of the hollow laminated rubber damper support shown in FIGS. 20 and 21, reinforcing ribs 5 are formed on the internal wall surface 4 and reinforcing ribs 5A are formed on external wall surface 2 of the laminated rubber support.

FIG. 22 shows a rectangular hollow laminated rubber damper support similar to FIG. 15, but in addition having internal and external wall reinforcing ribs 5 and 5A, respectively.

The inventive devices shown in FIGS. 16 through 22 are also reinforced with ring-shaped plates 3.

It will occur to those skilled in the art, upon reading the foregoing description of the preferred embodiments of the invention, taken in conjunction with a study of the drawings, that certain modifications may be made to the invention without departing from the intent or scope of the invention. It is intended, therefore, that the invention be construed and limited only by the appended claims.

What is claimed is:

1. A damping device having a predetermined spring constant, and having interior and exterior walls, for protecting a structure from seismic vibration, comprising:
    a plurality of dampers, each having a predetermined height and width, said dampers being vertically stacked and secured together, and each of said dampers including a plurality of rubber elastoplastic damper pads having hollow centers, said damper pads being vertically arrayed to define said exterior wall and to vertically align said hollow centers to define said interior wall;
    steel plates interposed between said rubber pads;
    an upper steel bearing plate positioned on top of the uppermost of said rubber pads;
    a lower steel bearing plate positioned beneath the lowermost of said rubber pads;
    means to secure said upper steel bearing plate of the first of said plurality of dampers to the lower steel bearing plate of the second of said plurality of dampers to form a vertical stack of dampers, said damping device being load bearing and positionable in load bearing relationship adjacent a vibrationable structure.

2. The damping device of claim 1, wherein said external and internal walls of said dampers are vertical.

3. The damping device of claim 1, wherein said external walls of said dampers are arcuately concave.

4. The damping device of claim 1, wherein said internal walls of said dampers are arcuately concave.

5. The damping device of claim 1, wherein said external and internal walls of said dampers are arcuately concave.

6. The damping device of claim 1, wherein said internal walls of said dampers are provided with vertically aligned anti-buckling reinforcing ribs.

7. The damping device of claim 1, wherein said external walls of said dampers are provided with vertically aligned anti-buckling reinforcing ribs.

8. The damping device of claim 1, wherein said external and internal walls of said dampers are provided with vertically aligned anti-buckling reinforcing ribs.

9. The damping device of claim 1, wherein the widest portion of each cross section of each of said dampers is substantially equal to the widest portion of each other of said dampers.

10. The damping device of claim 1, wherein the widest portion of each of said dampers, increases from damper to damper, progressing downwardly from top to bottom of said damping device.

11. The damping device of claim 1, wherein a plurality of said damping devices are horizontally spaced apart and interconnected with steel plates interposed between said dampers and spanning between said damping devices.

12. The damping device of claim 1, wherein said predetermined spring constant is modified by varying said height and/or said width of one or more of said plurality of dampers.

13. The damping device of claim 1, wherein said predetermined spring constant is modified by securing to said damping device one or more dampers comprised of solid rubber pads.

14. The damping device of claim 1, wherein said predetermined spring constant is modified by interposing between said damper pads one or more of said steel plates of the ring type having center holes therein alignable with said hollow centers of said damper pads.

15. The damping device of claim 1, wherein said predetermined spring constant is modified by interposing between said damper pads one or more of said steel plates of the disk type.

16. The damper device of claim 1, wherein said predetermined spring constant is modified by interposing between said damper pads one or more of said steel plates of the ring type and one or more of said steel plates of the disk type.

17. The damping device of claim 1, including a minor structure having a predetermined small mass $m_d$, a major structure having a great mass $m_1$ and a spring constant $k_1$, said damping device being interposed between said minor structure and said major structure to support said minor structure and to function as a spring having a predetermined spring constant $k_d$ and a period synchronizing with the natural period of said major structure, whereby said damping device and said minor structure function as a passive vibration control device for said major structure.

18. The damping device of claim 17, including an actuator secured between said minor structure and said major structure, adapted to control the period of said minor structure, whereby, in combination, said minor structure, said actuator, and said damping device function as an active vibration control device for said major structure.

19. The damping device of claim 1, including a first minor structure having a predetermined small mass $m_d$; a major structure having a great mass $m_1$, said damping device being interposed between said minor structure and said major structure to support said minor structure, said damping device having a predetermined spring constant $k_d$; a second minor structure mounted on said first minor structure, having a predetermined mass $m_e$ for reciprocating movement thereon, the relative masses of said major structure, said first minor structure, and said second minor structure being symbolized as $m_1 > m_d > m_e$; an actuator secured between said first and said second minor structures; and a centering spring secured between said first and said second minor structures, whereby, in combination, said first and said second minor structures, said actuator, said centering spring, and said damping device function as an active vibration control device for said major structure.

20. The damping device of claim 1, including a first vibratable mass and a plurality of said damping devices interposed between said first vibratable mass and said structure, whereby said plurality of damping devices supports said first vibratable mass on said structure and permits said first vibratable mass to passively vibrate responsive to vibration of said structure.

21. The damping device of claim 20, including means to interconnect said damping devices with steel plates interposed between said dampers and spanning between said damping devices.

22. The damping device of claim 20, wherein said predetermined period of said damping device is equal to the natural period of said structure.

23. The damping device of claim 20, wherein said predetermined period of said damping device is less than the natural period of said structure.

24. The damping device of claim 20, including an active vibration actuator secured between said first vibratable mass and said structure and adapted to actively vibrate said first vibratable mass responsive to vibration of said structure.

25. The damping device of claim 20, including a second vibratable mass shiftably mounted on an supported by said first vibratable mass, and an active vibration actuator secured between said first vibratable mass and said second vibratable mass and adapted to actively vibrate said second vibratable mass responsive to vibration of said structure.

26. The damping device of claim 20, wherein said first vibratable mass has a predetermined mass as a vibration absorption means, said structure having a determinable, said damping device and said predetermined spring constant having a period synchronizing with the natural period of said structure.

27. A damping device for protecting a structure from seismic vibration comprising:
- a plurality of stacked rubber dampers, each of said rubber dampers including two or more rubber pads having hollow centers, said rubber pads being vertically arrayed so as to concentrically align said hollow centers;
- steel plates having hollow centers interposed between said rubber pads, said steel plate hollow centers being concentrically aligned with said rubber pad hollow centers to form said damping device external and internal walls and a continuous vertical hole therethrough;
- a one-piece steel flat surface bearing plate positioned on the uppermost of said vertically arrayed rubber pads;
- a one-piece steel flat surface bearing plate positioned beneath the lowermost of said vertically arrayed rubber pads, said damping device being unrestricted to deflect laterally responsive to vibration and to return to an initial position of repose upon cessation of vibration.

* * * * *

UNITED STATES PATENT AND TRADEMARK OFFICE
CERTIFICATE OF CORRECTION

PATENT NO.   : 5,339,580
DATED        : August 23, 1994
INVENTOR(S)  : Koshika et al.

It is certified that error appears in the above-identified patent and that said Letters Patent is hereby corrected as shown below:

Claim 26, Col. 12, line 5, after "determinable" insert --mass--.

Signed and Sealed this

Twenty-ninth Day of November, 1994

Attest:

BRUCE LEHMAN

Attesting Officer

Commissioner of Patents and Trademarks